(12) United States Patent
Takei et al.

(10) Patent No.: US 8,961,666 B2
(45) Date of Patent: Feb. 24, 2015

(54) EXHAUST GAS TREATMENT APPARATUS

(75) Inventors: Noboru Takei, Kanagawa (JP); Sohsuke Kido, Kanagawa (JP); Naohiro Kaji, Kanagawa (JP); Akira Kumagai, Kanagawa (JP)

(73) Assignee: Chiyoda Corporation, Yokohama-shi (JP)

( * ) Notice: Subject to any disclaimer, the term of this patent is extended or adjusted under 35 U.S.C. 154(b) by 261 days.

(21) Appl. No.: 13/503,917

(22) PCT Filed: Oct. 21, 2010

(86) PCT No.: PCT/JP2010/068602
§ 371 (c)(1),
(2), (4) Date: Jul. 9, 2012

(87) PCT Pub. No.: WO2011/052478
PCT Pub. Date: May 5, 2011

(65) Prior Publication Data
US 2012/0273979 A1    Nov. 1, 2012

(30) Foreign Application Priority Data

Oct. 26, 2009    (JP) ................................. 2009-245480

(51) Int. Cl.
B01D 47/02     (2006.01)
B01D 53/50     (2006.01)
B01D 53/78     (2006.01)
F23J 15/02     (2006.01)

(52) U.S. Cl.
CPC .............. *B01D 53/504* (2013.01); *B01D 53/78* (2013.01); *F23J 15/02* (2013.01); *B01D 2251/404* (2013.01); *B01D 2251/606* (2013.01); *B01D 2257/302* (2013.01); *B01D 2258/0283* (2013.01); *F23J 2219/40* (2013.01)

USPC ................... 96/279; 96/351; 95/226; 95/235

(58) Field of Classification Search
None
See application file for complete search history.

(56) References Cited

U.S. PATENT DOCUMENTS

| 4,099,925 | A | * | 7/1978 | Yanagioka et al. | ........... 422/176 |
|---|---|---|---|---|---|
| 4,239,515 | A | * | 12/1980 | Yanagioka et al. | ............. 96/272 |
| 5,645,802 | A | * | 7/1997 | Yanagioka et al. | ........... 422/170 |
| 5,837,213 | A | * | 11/1998 | Nishino et al. | ........... 423/243.01 |
| 2011/0083592 | A1 | * | 4/2011 | McDonald et al. | ........... 110/215 |
| 2012/0267806 | A1 | * | 10/2012 | Takei et al. | ................. 261/121.1 |

FOREIGN PATENT DOCUMENTS

| JP | 8-206435 A | 8/1996 |
|---|---|---|
| JP | 9-239236 A | 9/1997 |

OTHER PUBLICATIONS

International Search Report of PCT/JP2010/068602, dated Jan. 11, 2011, (1 page).

* cited by examiner

*Primary Examiner* — Duane Smith
*Assistant Examiner* — Pankti Patel
(74) *Attorney, Agent, or Firm* — Westerman, Hattori, Daniels & Adrian, LLP

(57) ABSTRACT

The exhaust gas treatment apparatus has a sealed vessel which is vertically partitioned into two spaces by a partition. The partition is provided with a gas riser for deriving treated exhaust gas from an upper space of the absorbing liquid storage portion. A large number of sparger pipes are provided in a effective region, so as to reach inside an absorbing liquid stored in the absorbing liquid storage portion. A non-jet region is provided in the effective region. The froth layer is not formed in the non-jet region, and the absorbing liquid in a foamed state flows down from the froth layer therearound to circulate the absorbing liquid.

3 Claims, 3 Drawing Sheets

EXHAUST GAS TREATMENT APPARATUS

TECHNICAL FIELD

The present invention relates to an exhaust gas treatment apparatus which removes sulfur oxides in flue gas (combustion exhaust gas).

BACKGROUND ART

For example, in facilities such as thermal power plants where flue gas as combustion exhaust gas is produced, an exhaust gas treatment apparatus (desulfurization apparatus) treating exhaust gas in fuel gas is provided for the purpose of preventing air pollution due to flue gas containing sulfur oxide ($SO_x$) such as sulfurous acid gas ($SO_2$).

As a kind of such an exhaust gas treatment apparatus, there has been widely known one in which sulfurous acid gas ($SO_2$) contained in exhaust gas is in contact with an absorbing liquid consisting of an aqueous solution (sulfurous acid gas neutralizer slurry solution) dissolved or suspended with limestone ($CaCO_3$) and reacted and absorbed in the absorbing liquid (for example, see Patent Literature 1).

FIG. 4 shows a configuration of a main portion of this type of conventional desulfurization apparatus. A sealed vessel (absorption tower) 1 constituting the main portion of the desulfurization apparatus has an upper stage deck (upper partition) 3 and a lower stage deck (lower partition) 2 arranged vertically at a distance from each other. The decks 2 and 3 are provided as partitions defining an inlet gas introducing space of the sealed vessel 1. A lower space of the lower stage deck 2 serves as an absorbing liquid storage portion (storage vessel) 4, a space between the upper stage deck 3 and the lower stage deck 2 is an exhaust gas introducing portion 6, and an upper space of the upper stage deck 3 serves as an exhaust gas deriving portion 8. The absorbing liquid storage portion 4 stores therein an absorbing liquid K, consisting of aqueous slurry of limestone, at a predetermined liquid level. An exhaust gas introducing portion 6 is connected to an inlet duct 5 through which exhaust gas is introduced into the sealed vessel 1, and the exhaust gas deriving portion 8 is connected to an outlet duct 7 through which treated exhaust gas in the sealed vessel 1 is derived outside. The inlet duct 5 is provided with a gas cooling portion 17 which circulates and supplies a portion of the absorbing liquid K from a cooling line 11 by means of a pump 13 and is equipped with spray nozzles 16 for spraying the absorbing liquid as cooling water against the introduced exhaust gas and cooling the exhaust gas.

A larger number of openings (through-holes) are dispersively bored in the lower stage deck 2, and the through-holes are connected to upper end portions of the sparger pipes 9 hanging on a lower surface of the lower stage deck 2. The sparger pipes 9 extend downward, and their lower ends are inserted into the absorbing liquid K in the absorbing liquid storage portion 4 so that exhaust gas is ejected and dispersed under a liquid level of the absorbing liquid K.

Gas risers 10 placing an upper space 4a above the liquid level of the absorbing liquid in the absorbing liquid storage portion 4 in communication with the exhaust gas deriving portion 8 are provided between the lower stage deck 2 and the upper stage deck 3 so as to pass through the exhaust gas introducing portion 6. An air supply pipe (not shown) through which oxidation air is ejected and a mixer (not shown) for mixing the absorbing liquid K are provided on the bottom portion side of the absorbing liquid storage portion 4, and a blower (not shown) for pressure feeding air is connected to a base end side of the supply pipe.

The sealed vessel 1 is connected to a supply line for supplying an absorbing liquid for supply (limestone as an absorbent) into the sealed vessel 1.

A spray nozzle 18 is disposed above the sparger pipe 9 in order to wash out gypsum adhered to a surface of the gas riser 10 as described later and a mass of gypsum dropped on the sparger pipe 9 from the gas riser 10, and spray nozzles 19 are disposed around the gas riser 10. A filtrate obtained when gypsum is separated from the absorbing liquid as described later is supplied to the spray nozzles 18 and 19 through a pipe and intermittently sprayed.

In the sealed vessel 1 having the above constitution, when exhaust gas is fed from the inlet duct 5 to the exhaust gas introducing portion 6 while oxygen (air) is supplied into the absorbing liquid K through the supply pipe, the exhaust gas is ejected from ejection holes of the lower ends of the sparger pipes 9 and violently mixed with the absorbing liquid K, and a liquid phase continuous froth layer (jet bubbling layer) is formed. At this time, the mixer is rotated to mix the absorbing liquid K, and, at the same time, oxidation air supplied from the supply pipe is continuously supplied into the absorbing liquid K from a nozzle at a tip end of the supply pipe. Consequently, highly efficient gas-liquid contact is performed in the froth layer, and as shown by $SO_2 + CaCO_3 + \frac{1}{2}O_2 + H_2O \rightarrow CaSO_4 \cdot 2H_2O \downarrow + CO_2 \uparrow$, sulfurous acid gas ($SO_2$) contained in exhaust gas is oxidized. At the same time, a reaction in which sulfurous acid gas is neutralized with limestone in the absorbing liquid K takes place, and the sulfurous acid gas is absorbed and removed. Exhaust gas thus desulfurized reaches the exhaust gas deriving portion 8 through the gas risers 10 from a space above the liquid level of the absorbing liquid storage portion 4 (above the froth layer) to be passed through the outlet duct 7 from the exhaust gas deriving portion 8, and, thus, to be discharged outside from an exhaust flue. The outlet duct 7 is provided with an eliminator (not shown) which removes mist (water droplets) containing the above-described slurry.

On the lower stage deck 2, a large number of through-holes are substantially evenly dispersed and arranged as described above, and the sparger pipes 9 are provided in the respective through-holes. Further, the gas risers 10 are substantially evenly dispersed and arranged so that the gas riser 10 is arranged for each of the substantially predetermined number of the sparger pipes 9, and several hundred gas risers 10 may be provided, for example, although the number is one figure lower than the number of the sparger pipes 9.

CITATION LIST

Patent Literature

Patent Literature 1: Japanese Patent Application Laid-Open No. 8-206435

SUMMARY OF THE INVENTION

Technical Problem

In the above-described desulfurization apparatus (exhaust gas treatment apparatus), the many gas risers in communication with the upper space of the absorbing liquid storage portion are provided between the lower stage deck and the upper stage deck, desulfurized exhaust gas flows into the exhaust gas deriving portion on the upper stage deck by the gas risers, exhaust gas is discharged from the exhaust gas deriving portion to the outlet duct provided outside the sealed vessel, and mist is removed by an eliminator provided at the outlet duct.

Accordingly, the many gas risers are provided, and gases discharged from the gas risers are collected in the exhaust gas deriving portion to be derived to an exhaust flue through the eliminator of the outlet duct extending in a horizontal direction, whereby a complex structure is provided, so that it is difficult to reduce construction cost.

For a member in the sealed vessel, FRP (fiber-reinforced plastic) using a synthetic resin is largely used, for example, because exhaust gas and an absorbing liquid exhibit corrosivity with respect to metal. Thus, if high-temperature exhaust gas is introduced as it is, a member formed of FRP is affected by heat. Therefore, a slurry-like absorbing liquid containing gypsum is circulated and supplied to a gas cooling portion of the inlet duct, and, at the same time, this absorbing liquid (circulating liquid) is splayed from a spray nozzle, whereby exhaust gas introduced into the sealed vessel is humidified and cooled.

However, the absorbing liquid used for cooling contains a large amount of granular gypsum, so that there is a problem that gypsum contained in the sprayed absorbing liquid is adhered to a surface of the gas riser of the exhaust gas introducing portion in the exhaust gas introduction. The number of the gas risers is large, and an interval between the gas risers is small because the number of the gas risers is large, so that there is a problem that it is difficult to remove the adhered gypsum. Although the spray nozzles are arranged in order to remove gypsum, the pipe arrangement has a complex structure, and this causes increase in construction cost. Even if such a structure is employed, it is difficult to remove gypsum completely.

Thus, the cross section of the gas riser 10 is increased, and, at the same time, the number of the gas risers 10 is significantly reduced, whereby many of the above problems can be solved.

Here, air for oxidation is supplied to the absorbing liquid as described above, and, at the same time, limestone is supplied to the absorbing liquid, so that the absorbing liquid absorbs sulfur oxides as described above. However, if the froth layer has a portion that cannot move downward by being pushed up by air bubbles on the lower side at all times, a portion of the absorbing liquid in the froth layer cannot be circulated and moved toward a liquid layer side of the absorbing liquid on the lower side, and there is a possibility that dissolved oxygen concentration and pH of the absorbing liquid in the froth layer cannot be maintained at a value within a predetermined range suitable for absorption of sulfur oxides.

Meanwhile, many gas risers 10 are arranged in the prior art, so that the gas riser 10 is disposed for each of several ten or less sparger pipes 9, for example. Thus, in the arrangement position of the gas risers 10, a region of the lower stage deck 2 is occupied by the gas risers 10, whereby a portion where a plurality of the sparger pipes 9 substantially evenly dispersed and arranged is not arranged is generated.

Namely, in the lower stage deck 2, the sparger pipe 9 is not provided at a portion where the gas risers 10 are arranged, and air bubbles due to exhaust gas ejected from the sparger pipe 9 are not generated at this portion. The air bubble containing absorbing liquid forming the froth layer flows down toward the absorbing liquid from the froth layer in the region where the sparger pipes 9 adjacent to the region where the air bubbles are not generated are arranged.

According to the above constitution, the absorbing liquid contained in the froth layer and the absorbing liquid in the lower liquid layer of the froth layer are circulated, and the dissolved oxygen concentration and pH of the froth layer can be maintained at a value within a predetermined range. However, if the number of the gas risers 10 is significantly reduced, the absorbing liquid is not circulated satisfactorily, and the dissolved oxygen concentration and pH of the froth layer cannot be maintained at the value within the predetermined range, so that the desulfurization rate may be lowered.

In view of the above circumstances, the invention provides an exhaust gas treatment apparatus which can prevent that dissolved oxygen concentration and pH of a froth layer no longer can be maintained at a value within a predetermined range when the number of gas risers is significantly reduced to simplify the structure of the exhaust gas treatment apparatus and reduce construction cost.

Solution to Problem

In order to achieve the above object, an exhaust gas treatment apparatus according to claim 1 is provided with a sealed vessel in which exhaust gas is introduced and treated, a partition which vertically divides the inside of the sealed vessel, an absorbing liquid storage portion which is provided on the lower side of the partition of the sealed vessel and stores an absorbing liquid for desulfurization absorbing sulfur oxides from exhaust gas, an exhaust gas introducing portion which is provided on the upper side of the partition of the sealed vessel and introduces therein exhaust gas from outside of the sealed vessel, a plurality of sparger pipes which is in communication with the exhaust gas introducing portion, extends inside the absorbing liquid stored in the lower absorbing liquid storage portion from the partition, and ejects and disperses exhaust gas in the absorbing liquid of a liquid layer from the exhaust gas introducing portion to form a froth layer on the liquid layer of the absorbing liquid, and a gas riser which is in communication with a space above the absorbing liquid of the absorbing liquid storage portion and extends upward from the partition to pass through the exhaust gas introducing portion. In the exhaust gas treatment apparatus, a effective region except for a gas riser installation region of the partition, where the sparger pipes can be arranged includes a jet region where exhaust gas is ejected against the absorbing liquid by arranging the sparger pipes at an interval within a predetermined range and a non-jet region where exhaust gas is not ejected into the absorbing liquid by not arranging the sparger pipes at an interval wider than the interval within the predetermined range and moves down the absorbing liquid in the froth layer to the liquid layer side. The non-jet regions are provided so as to be dispersed in the effective region of the partition.

In the invention according to claim 1, the non-jet regions where the sparger pipes are not arranged in wider range than an interval within a predetermined range between the sparger pipes in the jet region of the partition are dispersively provided in the effective region where the gas riser of the partition is not provided. Since exhaust gas is not injected through the sparger pipe in the absorbing liquid storage portion below each of the non-jet region, air bubbles of exhaust gas are not generated, and the froth layer is not formed. However, in this state, the absorbing liquid containing the air bubbles of exhaust gas of the froth gas formed below the adjacent jet regions flows downward, and the absorbing liquid contained in the froth layer and the absorbing liquid in the liquid layer of the absorbing liquid storage portion are circulated and mixed, whereby dissolved oxygen concentration and pH of the froth layer can be maintained at a value within a predetermined range.

Accordingly, even if the number of the gas risers is reduced, the non-jet region is increased, whereby the dissolved oxygen concentration and so on can be prevented from being insufficient in the froth layer. Consequently, the number of the gas risers can be significantly reduced, and several ten or less gas risers, for example, twenty or less or ten or less gas risers may be provided, or the number of the gas riser may be one.

In the exhaust gas treatment apparatus according to claim 2, in the invention according to claim 1, S2/S1 that is a ratio of a total area S2 obtained by summing areas of the plurality of the non-jet regions with respect to an area S1 of the effective region of the partition is 0.05 to 0.25.

In the invention according to claim 2, since S2/S1 that is the ratio of the total area S2 obtained by summing the areas of the plurality of the non-jet regions with respect to the area S1 of the effective region of the partition is 0.05 to 0.25, even if the number of gas risers is reduced as described above, exhaust gas can be efficiently desulfurized.

Namely, when S2/S1 is not less than 0.05, at least the dissolved oxygen concentration and so on to the froth layer can be maintained at a value that does not interfere with desulfurization even if the number of gas risers is small. On the contrary, when S2/S1 is less than 0.05, the dissolved oxygen concentration and so on may be insufficient.

When S2/S1 is not more than 0.25, it is possible to prevent an area where the froth layer is formed from being reduced to lower an exhaust gas treatment capacity. In other words, when S2/S1 falls within the above-described range, an exhaust gas treatment amount corresponding to per unit area of the effective region of the partition can be optimized, and the space efficiency can be enhanced, so that the sealed vessel can be miniaturized.

Note that, as a boundary between the jet region and the non-jet region of the partition, a half of the interval within the predetermined range from the sparger pipe provided on a side of the jet region closest to the non-jet region is the jet region, and a portion separated from the sparger pipe relative to the jet region is the non-jet region.

In the exhaust gas treatment apparatus according to claim 3, in the invention according to claim 1 or 2, a plurality of through-holes in which the sparger pipes are arranged are substantially evenly provided in the effective region of the partition, and the through-holes are closed to provide the non-jet region.

In the invention according to claim 3, in construction of exhaust gas treatment apparatus, in a member constituting the partition, the through-holes are substantially evenly provided in the effective region regardless of either the jet region or the non-jet region, whereby processing of a member which becomes the partition is simplified, and cost reduction can be realized. In the exhaust gas treatment apparatus having a similar structure, the position and range of the non-jet region can be easily changed corresponding to exhaust gas treatment conditions such as a difference in exhaust gas composition.

Advantageous Effects of Invention

According to the present invention, portions where no sparger pipe is provided are dispersively provided in a portion where the sparger pipes of the partition are to be provided, whereby even if the number of the gas risers is reduced, it is possible to prevent a shortage of the dissolved oxygen concentration in the froth layer. Accordingly, the number of the gas risers can be significantly reduced.

DESCRIPTION OF EMBODIMENTS

Hereinafter, an embodiment according to the present invention will be described with reference to the drawings.

Figure 1:
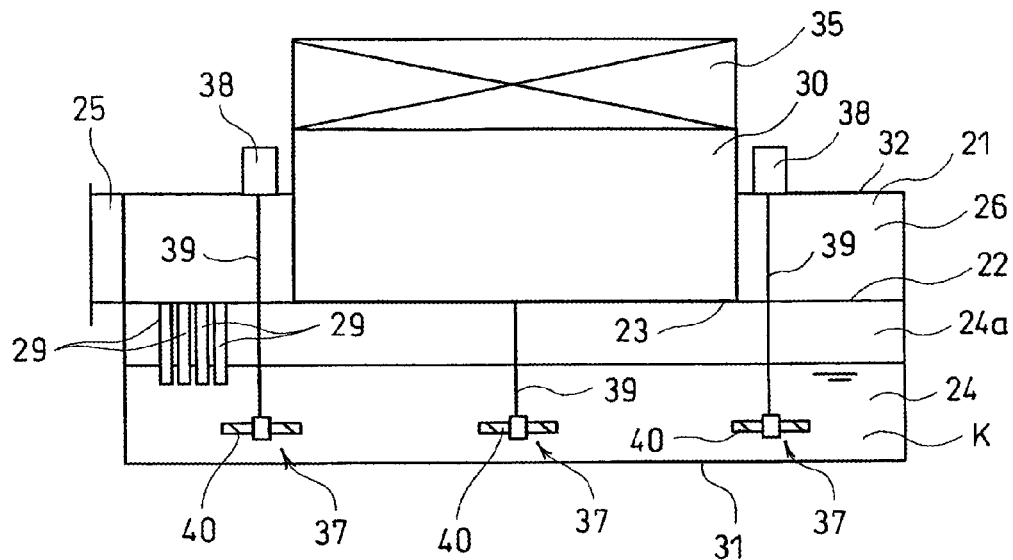
FIG. 1 is a schematic view showing an exhaust gas treatment apparatus according to a first embodiment of the present invention.
Figure 2:
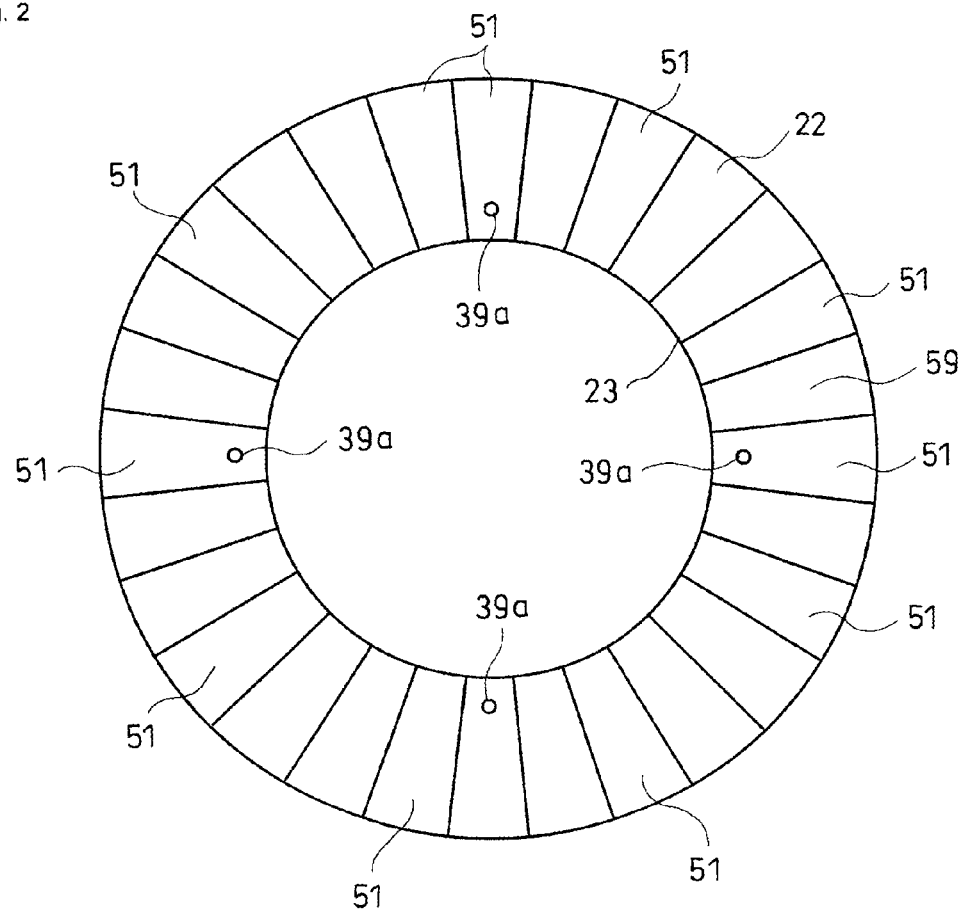
FIG. 2 is a plan view showing a partition of the exhaust gas treatment apparatus.
Figure 3:
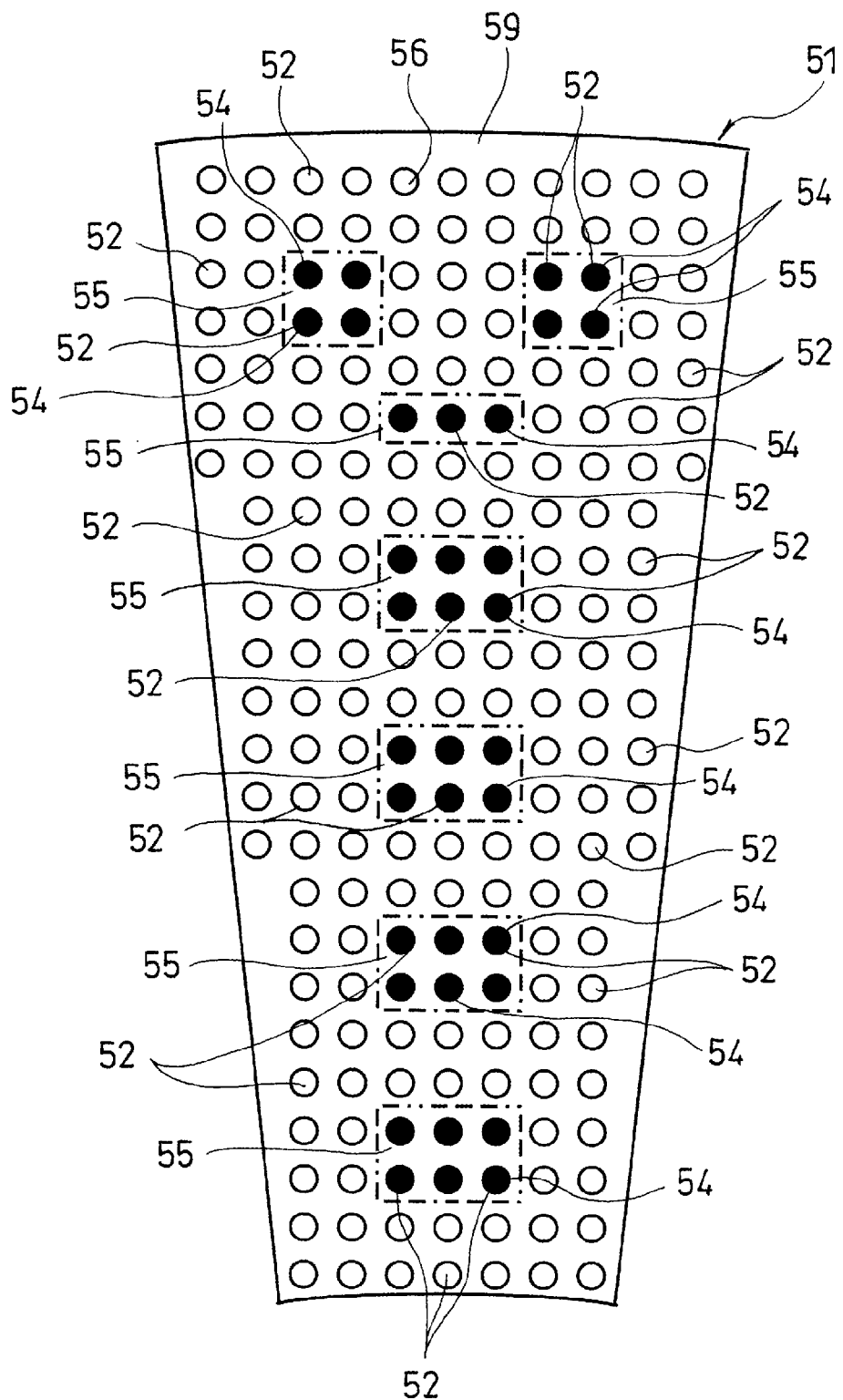
FIG. 3 is a plan view showing a deck panel constituting the partition.
Figure 4:
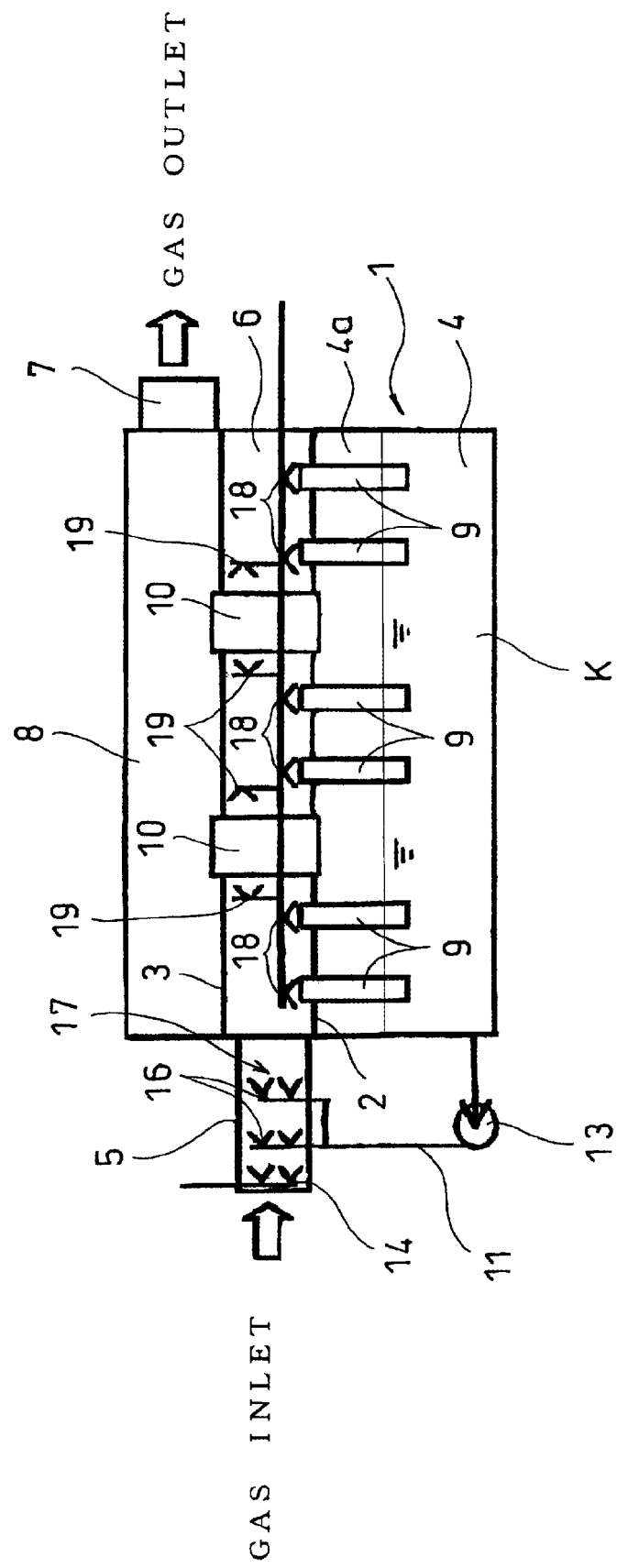
FIG. 4 is a schematic view showing a conventional exhaust gas treatment apparatus.

FIG. 1 is a schematic view showing an exhaust gas treatment apparatus according to an embodiment of the present invention. FIG. 2 is a plan view showing a partition of the exhaust gas treatment apparatus. FIG. 3 is a plan view showing a deck panel constituting the partition.

In a conventional exhaust gas treatment apparatus, a sealed vessel is vertically partitioned into three spaces by vertically provided two partitions, while, as shown in FIG. 1, a sealed vessel 21 of the exhaust gas treatment apparatus in this example is vertically separated into two spaces by a single partition (deck) 22.

Although the sealed vessel 21 in this example is formed into a cylindrical shape with a bottom plate and a top plate, for example, it may be formed into a square cylindrical shape (rectangular solid shape and square solid shape) with a bottom plate and a top plate.

A portion of the sealed vessel 21 lower than the partition 22 is an absorbing liquid storage portion 24, and a portion of the sealed vessel 21 upper than the partition 22 is an exhaust gas introducing portion 26. The lower side of the absorbing liquid storage portion 24 is a bottom portion 31 of the sealed vessel 21, and the upper side of the exhaust gas introducing portion 26 is a top plate portion (lid portion) 32 of the sealed vessel 21.

In this example, the partition 22 is formed into a disk shape, and a large opening 23 connected to the single gas riser 30 is formed in a central portion of the partition 22. The area of the opening 23 is, for example, approximately ⅓ of the area of the entire partition 22 including the opening 23. The outer circumference of the disk-shaped partition 22 and the inner circumference of the partition 22 (the outer circumference of the opening 23) are arranged coaxial with each other (concentrically).

The partition 22 has a large number of through-holes (not shown) substantially evenly dispersed and formed at a portion outside the opening 23, and sparger pipes 29 are suspended so as to extend downward from the partition 22. The sparger pipes 29 are provided so as to reach from the partition 22 to an inside of the absorbing liquid K stored in the absorbing liquid storage portion 24 under the partition 22. In FIG. 1, although only a portion of the sparger pipe 29 is illustrated, in fact, the sparger pipe 29 are provided so as to be dispersed on substantially the entire surface of the partition 22 except for the opening 23 of the partition 22.

Further, the partition 22 has through-holes 39a through which a driving shaft 39 of a mixer 37 to be described later passes.

The gas riser 30 is provided at a portion corresponding to the disk-shaped opening 23 of the partition 22 so that the opening 23 and the lower end portion of the gas riser 30 overlap each other. The gas riser 30 is formed into a cylindrical shape. The lower end portion of the gas riser 30 is fixed to the partition 22 to be disposed in such a state that the opening 23 is closed by the upper side of the partition 22. The gas riser 30 is in a state of being in communication with an upper space 24a above the liquid level of the absorbing liquid in the absorbing liquid storage portion 24 through the opening 23.

The upper end portion of the gas riser 30 passes through the top plate portion 32 of the sealed vessel 21 in a state of passing through the exhaust gas introducing portion 26 and projects upward from the top plate portion 32.

The inside of the gas riser 30 is isolated from the exhaust gas introducing portion 26 and, at the same time, is in communication with the upper space of the absorbing liquid storage portion 24 through the opening 23 of the partition 22.

The upper end above the top plate portion 32 of the sealed vessel 21 of the gas riser 30 is connected to the eliminator 35. The eliminator 35 is formed to have substantially the same size as that of the gas riser 30 and is in a state of covering the entire opening of the gas riser 30. The eliminator 35 removes mist of treated exhaust gas derived outside the sealed vessel 21 by the gas riser 30.

The sealed vessel 21 is provided with the mixers 37, and the mixer 37 is provided with a drive source 38 disposed on the top plate portion 32 of the sealed vessel 21, the driving shaft 39 reaching from the drive source 38 to the inside of the absorbing liquid storage portion 24 through the exhaust gas introducing portion 26 and the partition 22, and mixing blades 40 provided at a tip end portion of the drive shaft 39. The mixers 37 are arranged around the gas riser 30.

Although not illustrated, as in the prior art, there are provided, for example, a mechanism which supplies oxygen into the absorbing liquid K in the absorbing liquid storage portion 24 of the sealed vessel 21, a mechanism which supplies an absorbent to the absorbing liquid storage portion 24, and a solid-liquid separation mechanism which extracts the absorbing liquid K from the absorbing liquid storage portion 24 and separates a solid content such as gypsum from the absorbing liquid K.

In such an exhaust gas treatment apparatus, exhaust gas is introduced into the sealed vessel 21 from the inlet duct 25 in communication with the exhaust gas introducing portion 26, and the introduced exhaust gas is ejected in the absorbing liquid in the absorbing liquid storage portion 24 from the sparger pipes 29 provided in the partition 22 as a bottom portion of the exhaust gas introducing portion 26 and is dispersed into the absorbing liquid K. At the same time, the froth layer is formed, and exhaust gas is in gas-liquid contact with the absorbing liquid K.

The exhaust gas desulfurized by gas-liquid contact is discharged to the upper space 24 above the absorbing liquid K.

Subsequently, the treated exhaust gas moves up inside the gas riser 30 from the opening 23 connected to the lower end portion of only one gas riser 30 of the partition 22.

The treated exhaust gas that has moved up inside the gas riser 30 reaches the eliminator 35. Droplets (mist) of the treated exhaust gas are removed by the eliminator 35, and the treated exhaust gas is discharged outside the exhaust gas treatment apparatus.

In the above exhaust gas treatment apparatus, the partition 22 in this example is provided with a plurality of substantially trapezoidal (fan-like) deck panels (partition dividers) 51 with circular-arc upper side and bottom side which is formed by dividing the circular partition 22 having the circular opening 23 in the center by a plurality of parting lines along the radial direction. Namely, the partitions 22 are arranged in the circumferential direction of the plurality of the fan-like deck panels 51 and connected to each other to be formed into an annular disk shape.

The deck panels 51 have a large number of the through-holes 52 for mounting the sparger pipes 29. The through-holes 52 are arranged and aligned in the horizontal and vertical directions with a predetermined interval. Although the through-holes 52 are essentially arranged in the horizontal and vertical directions at even intervals, there may be a slight deviation in the intervals, and the through-holes 52 may be arranged in the horizontal and vertical directions at an interval within a predetermined range.

In FIG. 3, although the horizontal lines and the vertical lines of the through-holes 52 are arranged linearly, the horizontal lines and the vertical lines may not be necessarily arranged on single straight lines and may be arranged in a zig-zag manner. Alternatively, hexagonal regions may be arranged in a honeycomb manner so that the through-hole 52 is provided at the central portion of each region, and it is preferable that the through-holes 52 are arranged evenly dispersively as much as possible.

In this example, all the through-holes 52 provided in the deck panels 51 constituting the partition 22 are not provided with the sparger pipes 29, and the through-holes 52 closed by a closing member (cap member) 54 are provided without being provided with the sparger pipes 29.

In the partition 22 (deck panel 51), the sparger pipes 29 are not provided in the closed through-holes 52, whereby a portion having the closed through-holes 52 is the non-jet region 55 where exhaust gas is not ejected toward the absorbing liquid K in the absorbing liquid storage portion 24 under the partition 22. Meanwhile, a region where the through-holes 52 of the partition 22 (deck panel 51) are not closed by the closing member 54 and the through-holes 52 have the sparger pipes 29 is the jet region 56 where exhaust gas is ejected toward the absorbing liquid K in the absorbing liquid storage portion 24 from the sparger pipe 29 of the partition 22.

In the partition 22, the through-holes 52 cannot be provided at a portion of the opening 23 in which the gas risers 30 are arranged, and a portion of the partition 22 where the opening 23 is mainly removed is the effective region 59 in which the through-holes 52 are formed and the sparger pipes 29 can be mounted. Accordingly, in the deck panel 51 not including the portion where the opening 23 is formed, although all the regions are essentially the effective regions, the outer peripheral portion partially has a region where the through-hole 52 cannot be provided, although depending on the arrangement of the through-holes 52.

Although the region where the through-hole cannot be provided may be regarded as an ineffective region, the region may be regarded as the non-jet region 55.

The non-jet region 55 and the jet region 56 are provided in the effective region 59. In a portion where the jet region 56 and the non-jet region 55 are adjacent to each other and the through-hole 52 provided with the sparger pipe 29 and the through-hole 52 closed by the closing member 54 are adjacent to each other, a portion formed by linearly connecting central portions between the through-hole 52 provided with the sparger pipe 29 and the through-hole 52 closed by the closing member 54 is a boundary between the jet region 56 and the non-jet region 55.

Since the plurality of the non-jet regions 55 is essentially provided in the jet region 56, the above-described boundary surrounds the plurality of the through-holes 52 closed by the closing member 54 provided in the non-jet region 55.

The non-jet region 55 includes the plurality of the closed through-holes 52 and preferably includes three or more closed through-holes 52.

The plurality of non-jet regions 55 is provided so as to be substantially evenly dispersed with respect to the effective region 59.

As described above, the entire effective region 59 of the partition 22 is not regarded as the jet region 56, and in a case where the plurality of the non-jet regions 55 is dispersed and substantially evenly provided with respect to the inside of the jet region 56, in the absorbing liquid in the absorbing liquid storage portion 24 under the partition 22, exhaust gas is ejected from the sparger pipes 29 to form the froth layer below the jet region 56. In the froth layer, the absorbing liquid in a state of being foamed by air bubbles generated on the lower side at all times is in a floating state.

Meanwhile, on the lower side of the non-jet region 55, the foamed absorbing liquid forming the froth layer flows down from the froth layer on the lower side of the adjacent jet regions 56.

According to this constitution, on the lower side of the jet region 56, the foamed absorbing liquid moves upward relative to the liquid level of the absorbing liquid to form the froth layer, and on the lower side of the non-jet region 55, the foamed absorbing liquid flows down from the froth layer to return to under the liquid level of the absorbing liquid. The foamed absorbing liquid in the froth layer is circulated with the absorbing liquid under the foamed absorbing liquid at all times, and the dissolved oxygen concentration and pH of the foamed absorbing liquid in the froth layer are maintained at a value within a predetermined range.

In the partition 22, a ratio (S2/S1) of a total area S2 obtained by summing areas of the plurality of non-jet regions 55 with respect to the total area S1 of the effective region (the sum of the area of the jet region and the area of the non-jet region) is preferably 0.05 to 0.25 and further preferably 0.1 to 0.2.

As S2/S1 becomes smaller, the circulation of the formed absorbing liquid forming the froth layer is difficult to occur. The larger S2/S1 becomes, the smaller the area of the region where the froth layer is formed is.

Namely, when S2/S1 is less than 0.1, the circulation of the absorbing liquid may become insufficient, and when S2/S1 is less than 0.05, the circulation may become more insufficient.

When S2/S1 is not less than 0.2, the area where the froth layer is produced is reduced relative to the area of the effective region, and it may be difficult to treat exhaust gas efficiently. When S2/S1 is not less than 0.25, treatment of exhaust gas may become more insufficient.

When S2/S1 is too small or too large, the exhaust gas treatment capacity is lowered with respect to the size of the sealed vessel 1 or the size of the effective region 59 of the partition 22. When S2/S1 is a suitable value, the highest exhaust gas treatment capacity can be realized with respect to the size of the sealed vessel 1 or the size of the effective region 59 of the partition 22. Consequently, S2/S1 is in the range of the above value with respect to the required exhaust gas treatment capacity, whereby the area of the sealed vessel 1 is reduced, so that miniaturization can be realized.

Even if the number of the gas risers 30 is extremely reduced in comparison with the prior art, the non-jet regions 55 where the sparger pipe 29 is not provided are dispersively provided in the effective region 59 of the partition 22 where the gas riser 30 is not provided as described above, whereby the absorbing liquid forming the froth layer and the absorbing liquid of the liquid layer are circulated as described above, and the dissolved oxygen concentration and pH of the froth layer can be maintained at a value within a predetermined range.

According to the above constitution, deterioration of the efficiency of desulfurization can also be prevented even if the number of the gas risers 30 is reduced, and the number of the gas risers 30 can be reduced. When the number of the gas risers 30 is reduced, the structure of the exhaust gas treatment apparatus can be extremely simplified.

In particular, several hundred gas risers in the prior art are reduced to the single gas riser 30, whereby the structure can be extremely simplified.

Further, the reduction of the number of the gas risers 30 simplifies the constitution that removes gypsum and so on adhered to the surface of the gas riser 30, so that the construction cost can be further reduced.

The number of the gas risers 30 is extremely reduced, whereby there can be realized a structure that can satisfactorily remove gypsum even if the constitution that removes adhered gypsum is simplified, and maintenance can be simplified.

In this example, in the exhaust gas introducing portion 26 on the partition 22 in which many gas risers have been arranged in the prior art, only the gas riser 30 is disposed in the center, so that it is possible to enter at the time of maintenance, and maintenance is extremely facilitated.

Further, in this example, a layer being an exhaust gas deriving portion in the prior art is not required to be provided in the sealed vessel 21, so that the number of the partitions can be reduced, and, at the same time, the construction cost can be reduced by reducing the height of the sealed vessel 21 and reducing the capacity of the sealed vessel 21.

The structure that derives treated exhaust gas to the outside of the exhaust gas treatment apparatus is provided not on the lateral side of the sealed vessel 21 but on the upper side thereof by the gas riser 30. Since the eliminator 35 is disposed on the gas riser 30 and above the sealed vessel 21, the eliminator 35 is disposed at a portion occupied by the sealed vessel 21, and, at the same time, exhaust gas is derived at the portion occupied by the sealed vessel 21, so that the space efficiency of an exhaust gas treatment apparatus can be enhanced.

Further, the height of the sealed vessel 21 can be kept low because the exhaust gas deriving portion is not provided as described above. When the mixer 37 is disposed, a distance between the drive source 38 on the sealed vessel 21 and the mixing blade 40 of the absorbing liquid storage portion 24 is reduced to reduce the length of the driving shaft 39, and, thus, to reduce the weight of a portion to be driven, whereby the driving force in the drive source 38 can be reduced. When the length of the driving shaft 39 is reduced, the driving shaft 39 can be used even if the strength is reduced. The thickness of the driving shaft 39 is reduced as well as reduction in the length, or the thickness of the driving shaft 39 is reduced when the driving shaft 39 has a tubular shape, whereby the weight of the driving shaft 39 can be further reduced.

According to the above constitution, the construction cost of the exhaust gas treatment apparatus can be reduced.

In the above example, although each cross-sectional shape of the sealed vessel 21 and the gas riser 30 is a circle, the cross-sectional shape is not limited to a circle and may be a square or a polygon. Although the single gas riser 30 is provided in the single sealed vessel 21, a plurality of combinations of the single partition 22 and the single gas riser 30 is connected to each other, and the single sealed vessel 21 is constituted of the plurality of pairs of the partition 22 and the gas riser 30, whereby the exhaust gas treatment capacity may be enhanced plural times. In this case, a plurality of the gas risers 30 may be provided in the single sealed vessel 21.

In the above case, the number of the gas risers 30 provided in the single sealed vessel 21 is preferably not more than several ten and, for example, not more than twenty.

The sealed vessel 21 may be vertically separated into three layers by vertically provided two partitions as in the prior art, and the exhaust gas deriving portion may be provided on the uppermost layer. The non-jet regions 55 may be dispersively provided on the partition 22 in the prior art structure, whereby the number of the gas risers 30 may be significantly reduced.

REFERENCE SIGNS LIST

K Absorbing liquid
21 Sealed vessel
22 Partition
24 Absorbing liquid storage portion
26 Exhaust gas introducing portion
29 Sparger pipe
30 Gas riser
52 Through-hole
54 Closing member
55 Non-jet region
56 Jet region
59 Effective region

The invention claimed is:

1. An exhaust gas treatment apparatus comprising:
a sealed vessel in which exhaust gas is introduced and treated;
a partition which vertically divides an inside of the sealed vessel;
an absorbing liquid storage portion which is provided under the partition of the sealed vessel and stores an absorbing liquid for desulfurization absorbing sulfur oxides from exhaust gas;
an exhaust gas introducing portion which is provided above the partition of the sealed vessel and introduces exhaust gas from outside of the sealed vessel;
a plurality of sparger pipes in communication with the exhaust gas introducing portion and extending inside the absorbing liquid stored in the absorbing liquid storage portion on the lower side from the partition to jet and adapted to disperse exhaust gas into the absorbing liquid in a liquid layer from the exhaust gas introducing portion and, thus, to form a froth layer on the liquid layer of the absorbing liquid; and
a gas riser in communication with an upper space above the absorbing liquid in the absorbing liquid storage portion, extending upward from the partition, and passing through the exhaust gas introducing portion, wherein
an effective region, except for a gas riser installation region of the partition, wherein sparger pipes are arranged includes
a jet region where exhaust gas is ejected into the absorbing liquid by arranging the sparger pipes at an interval within a predetermined range, and
a plurality of non-jet regions where exhaust gas is not ejected into the absorbing liquid by not arranging the sparger pipes at an interval wider than the interval within the predetermined range,
with the plurality of the non-jet regions being dispersively provided in the effective region of the partition.

2. The exhaust gas treatment apparatus according to claim 1, wherein S2/S1 that is a ratio of a total area S2 obtained by summing areas of the plurality of the non-jet regions with respect to an area S1 of the effective region of the partition is 0.05 to 0.25.

3. The exhaust gas treatment apparatus according to claim 1 or 2, wherein a plurality of through-holes in which the sparger pipes are arranged is substantially evenly provided in the effective region of the partition, and the through-holes are closed to provide the non-jet region.

* * * * *